United States Patent
Dennehy (10) Patent No.: US 10,013,461 B2
(45) Date of Patent: Jul. 3, 2018

(54) ANALYZING A DATA SET UTILIZING INFLECTION POINTS

(71) Applicant: International Business Machines Corporation, Armonk, NY (US)

(72) Inventor: Mark P. Dennehy, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 340 days.

(21) Appl. No.: 14/644,537

(22) Filed: Mar. 11, 2015

(65) Prior Publication Data

US 2016/0267146 A1 Sep. 15, 2016

(51) Int. Cl.
G06F 17/30 (2006.01)
G06F 17/00 (2006.01)

(52) U.S. Cl.
CPC .............................. *G06F 17/30528* (2013.01)

(58) Field of Classification Search
IPC .............................................. G06F 17/30,17/00
See application file for complete search history.

(56) References Cited

U.S. PATENT DOCUMENTS

| 8,108,394 | B2 | 1/2012 | Johnson et al. |
| 8,731,117 | B2 | 5/2014 | Haran et al. |
| 2003/0212652 | A1 | 11/2003 | Gold |
| 2007/0226810 | A1* | 9/2007 | Hotti .................. H04L 67/1095 726/30 |
| 2010/0104198 | A1* | 4/2010 | Chang ........................ G06T 7/60 382/199 |
| 2011/0164041 | A1* | 7/2011 | Miura ................... G06T 11/203 345/442 |
| 2014/0012871 | A1 | 1/2014 | Jeon et al. |
| 2014/0046975 | A1 | 2/2014 | Wang |

OTHER PUBLICATIONS

Kreuter, et al., "Accelerating Genomic Analyses with Parallel Sliding Windows", Department of Computer Science, University of Virginia, Nov. 16, 2010.
Neeraj, et al., "Mining Maximum Frequent Item Sets Over Data Streams Using Transaction Sliding Window Techniques", International Journal of Information Technology Convergence and Services (IJITCS), vol. 3, No. 2, Apr. 2013.

(Continued)

*Primary Examiner* — Yicun Wu
(74) *Attorney, Agent, or Firm* — Daniel R. Simek (57) ABSTRACT

In a method for analyzing a data set, one or more processors identifying a data set that includes sequences of data points, identifying a sequence of data points in the identified data set, identifying a window of sequences of data points in the identified data set, wherein the window of sequences of data points is defined based on information including one or more of: a defined number of sequences of data points before and after the identified sequence of data points and a defined reference to a feature of the identified data set, retrieving a set of inflection points in the identified data set that are within the identified window of sequences of data points, and determining: a maximum value, a minimum value, or both a maximum and minimum value, based on the retrieved inflection points that are within the identified window of sequences of data points.

20 Claims, 8 Drawing Sheets

(56) References Cited

OTHER PUBLICATIONS

Zhao, et al., "Evaluating MAX and MIN over Sliding Windows with Various Size Using the Exemplary Sketch*", DASFAA 2007, LNCS 4443, pp. 652-663, 2007, © Springer-Verlag Berlin Heidelberg 2007.
Li, et al., "No Pane, No Gain: Efficient Evaluation of Sliding-Window Aggregates over Data Streams", SIGMOD Record, vol. 34, No. 1, Mar. 2005. pp. 39-44, http://www.whitworth.edu/Academic/Department/MathComputerScience/Faculty/TuckerPeter/PDF/p39-li.pdf.

* cited by examiner

```
import random
import time
import cProfile
import sys def generateInflectionPoints(data):
    inflectionPoints = [ ]
    previous = data[0]
    sense = True
    index = 0
    for i in data:
        if (sense):
            if i < previous: #Inflection
                inflectionPoints.append(index-1)
                sense = not sense
        else:
            if i > previous: #Inflection
                #inflectionPoints.append(index-1)
                sense = not sense
        previous = i
        index += 1
    return inflectionPoints def getLocalMax(index,windowSize,data,inflectionPoints):
    startIndex = index-windowSize
    endIndex = index+windowSize
    if (startIndex < 0):
        startIndex=0
    if (endIndex > (len(data)-1)):
        endIndex=(len(data)-1)

localMaxima = [ ]
    if (endIndex <= inflectionPoints[0]):
        inflectionIndex = 0
        for i in range(startIndex,endIndex):
            if (i == inflectionPoints[inflectionIndex]):
                localMaxima.append(i)
                inflectionIndex += 1 if len(localMaxima) == 1:
        return data[localMaxima[0]]
    elif len(localMaxima) == 0:
        if data[startIndex] > data[endIndex]:
            return data[startIndex]
        else:
            return data[endIndex]
    else:
        localMaximaValues = [ ]
        for i in localMaxima:
            localMaximaValues.append(data[i])
        localMaximaValues.sort(reverse=True)
        return localMaximaValues[0]

def getLocalMaxOld(index,windowSize,data):
    startIndex = index-windowSize
    endIndex = index+windowSize
    if (startIndex < 0):
        startIndex=0
    if (endIndex > (len(data)-1)):
        endIndex=(len(data)-1)
```

FIG. 3A

```
localMax = data[startIndex]
    for i in range(startIndex,endIndex):
        if data[i] > localMax :
            localMax = data[i]

return localMax def test(rows,window,data):
    startTime = time.clock( )
    inflectionPoints = generateInflectionPoints(data)
    index = 0
    maxima = [ ]
    for row in data:
        maxima.append(getLocalMax(index,window,data,inflectionPoints))
        index += 1
    time1 = time.clock( ) - startTime startTime = time.clock( )
    index = 0
    maxima = [ ]
    for row in data:
        maxima.append(getLocalMaxOld(index,window,data))
        index += 1
    time2 = time.clock( ) - startTime
    return time1,time2 if __name__ == '__main__':
    maxData = 10000
    data = [ ]
    print "Creating random data"
    for i in range (maxData):
        data.append(random.uniform(-100,100))
    print "Beginning test runs"

output = [ ]
    output.append("rows,window,TimeSaved,NewTime,BFITime\n")
    for rows in range(100,maxData+1,maxData/10):
        print str(rows)+" rows",
        for window in range (10,rows+1,rows/10):
            newTime,bfiTime = test(rows,window,data[0:rows])
            output.append("{0},{1},{4:20.19},{2:20.19},{3:20.19}\n".format(rows,window,
                newTime,bfiTime,bfiTime-newTime))
                    print ".",
                    sys.stdout.flush( )
                print print "Writing Final data to max.csv"
    fo = open("max.csv","w")
    for i in output:
        fo.write(i)
    fo.close( )
```

FIG. 3B

```
import random
import time
import cProfile
import sys
from multiprocessing import Process,Queue
import math def generateInflectionPoints(data):
    inflectionPoints = [ ]
    previous = data[0]
    sense = True
    index = 0
    for row in data:
        if (sense):
            if row < previous: #Inflection
                inflectionPoints.append(index-1)
                sense = not sense
        else:
            if row > previous: #Inflection
                #inflectionPoints.append(index-1)
                sense = not sense
        previous = row
        index += 1
    return inflectionPoints def getLocalMax(index,windowSize,data,inflectionPoints):
    startIndex = index-windowSize
    endIndex = index+windowSize
    if (startIndex < 0):
        startIndex=0
    if (endIndex > (len(data)-1)):
        endIndex=(len(data)-1)

localMaxima = [ ]
    if (endIndex <= inflectionPoints[0]):
        ipIndex = 0
        for i in range(startIndex,endIndex):
            if (i == inflectionPoints[ipIndex]):
                localMaxima.append(i)
                ipIndex += 1 if len(localMaxima) == 1:
        return data[localMaxima[0]]
    elif len(localMaxima) == 0:
        if data[startIndex] > data[endIndex]:
            return data[startIndex]
        else:
            return data[endIndex]
    else:
        localMaximaValues = [ ]
        for i in localMaxima:
            localMaximaValues.append(data[i])
        localMaximaValues.sort(reverse=True)
        return localMaximaValues[0]
```

```
def getLocalMaxOld(index,windowSize,data):
    startIndex = index-windowSize
    endIndex = index+windowSize
    if (startIndex < 0):
        startIndex=0
    if (endIndex > (len(data)-1)):
        endIndex=(len(data)-1)

localMax = data[startIndex]
    for i in range(startIndex,endIndex):
        if data[i] > localMax :
            localMax = data[i]

return localMax def test(rows,window,data,outputQueue):
    print "process started: "+str(rows)+" rows, "+str(window)+" window"
    sys.stdout.flush( )
    startTime1 = time.clock( )
    inflectionPoints = generateInflectionPoints(data)

index = 0
    maxima = [ ]
    for i in data:
        maxima.append(getLocalMax(index,window,data,inflectionPoints))
        index += 1
    time1 = time.clock() - startTime1 startTime2 = time.clock( )
    index = 0
    maxima = [ ]
    for i in data:
        maxima.append(getLocalMaxOld(index,window,data))
        index += 1
    time2 = time.clock( ) - startTime2 print "process ending: "+str(rows)+" rows, "+str(window)+" window"
    sys.stdout.flush( )
    output = rows,window,time1,time2
    outputQueue.put(output)
    return time1,time2
```

FIG. 4B

```
if __name__ == '__main__':
    print "Creating random data"
    maxData = 1000000
    data = [ ]
    for i in range (maxData):
        data.append(random.uniform(-100,100))

print "Beginning test runs"
    queue = Queue()
    output = [ ]
    processes = [ ]
    output.append("rows,window,TimeSaved,NewTime,BFITime\n")
    for rows in range(100,maxData+1,maxData/10):
        for window in range (10,rows+1,rows/10):
            t = Process(target=test, args =
(rows,window,data[0:rows],queue))
            processes.append(t)
            t.start( )
        print for process in processes:
        process.join( )

while not queue.empty( ):
        rows,window,newTime,bfiTime = queue.get( )

output.append("{0},{1},{4:20.19},{2:20.19},{3:20.19}\n".format(rows,window
,newTime,bfiTime,bfiTime-newTime))

print "Writing Final data to max.csv"
    fo = open("max.csv","w")
    for i in output:
        fo.write(i)
    fo.close( )
```

ANALYZING A DATA SET UTILIZING INFLECTION POINTS

BACKGROUND OF THE INVENTION

The present invention relates generally to the field of data management, and more particularly to analyzing data sets.

A data set is a collection of data where every column of the table represents a particular value and each row corresponds to a given member of the data set. The data set lists values for each of the variables, such as height and weight of an object, for each member of the data set. Commonly, a data set corresponds to the contents of a single database table or a single statistical matrix. The values in a data set may be numbers, such as real numbers or integers (e.g., representing a person's height in centimeters) but may also be nominal data (i.e., not consisting of numerical values), for example, representing a characteristic of a person. More generally, values may be of any of the kinds described as a level of measurement. For each variable, the values are normally all of the same kind. However, there may also be missing values.

Database analytics has seen an emerging emphasis on analyzing massive and complex data sets (i.e., big data). Big data is a term for a collection of data sets so large or complex that processing the collection of data sets becomes difficult when using traditional data processing applications. Big data usually includes data sets with sizes beyond the ability of commonly used software tools to capture, curate, manage, and process data within a tolerable elapsed time.

SUMMARY

Aspects of the present invention disclose a method, computer program product, and system for analyzing a data set. The method includes one or more processors identifying a data set that includes sequences of data points. The method further includes one or more processors identifying a sequence of data points in the identified data set. The method further includes one or more processors identifying a window of sequences of data points in the identified data set, wherein the window of sequences of data points is defined based on information including one or more of: a defined number of sequences of data points before and after the identified sequence of data points and a defined reference to a feature of the identified data set. The method further includes one or more processors retrieving a set of inflection points in the identified data set that are within the identified window of sequences of data points, wherein a maximum inflection point is a data point in a sequence of data points where values in the identified data set transition from increasing in value to decreasing in value and a minimum inflection point is a data point in a sequence of data points where values in the identified data set transition from decreasing in value to increasing in value. The method further includes one or more processors determining one of: a maximum value, a minimum value and both a maximum value and a minimum value, based on the retrieved inflection points that are within the identified window of sequences of data points.

DETAILED DESCRIPTION

Embodiments of the present invention allow for analyzing a data set to determine maximum and/or minimum value. In a data set, each inflection point is identified and stored. A window of rows is identified, and the stored inflection points that are within the window of rows are retrieved and compared to determine local maximum and/or minimum values. After the local maximum and/or minimum values are determined, the window is moved across the data set to analyze additional rows of data and identify maximum and/or minimum values. Additional embodiments of the present invention utilize a stored database of identifications of inflection points to determine maximum and/or minimum values in a data set in a searching method that is parallelizable and an increased speed (relative to traditional methods).

Some embodiments of the present invention recognize that it can be computationally expensive to perform a single comparison-based maximum/minimum function on a large data set. The number of comparisons rise with the product of the number of rows in the data set (and the number of rows in a window). The computations expense and performance requirements can conflict with the performance expectations that are associated with big data and other forms of data analytics.

Implementation of embodiments of the invention may take a variety of forms, and exemplary implementation details are discussed subsequently with reference to the Figures.

Figure 1:
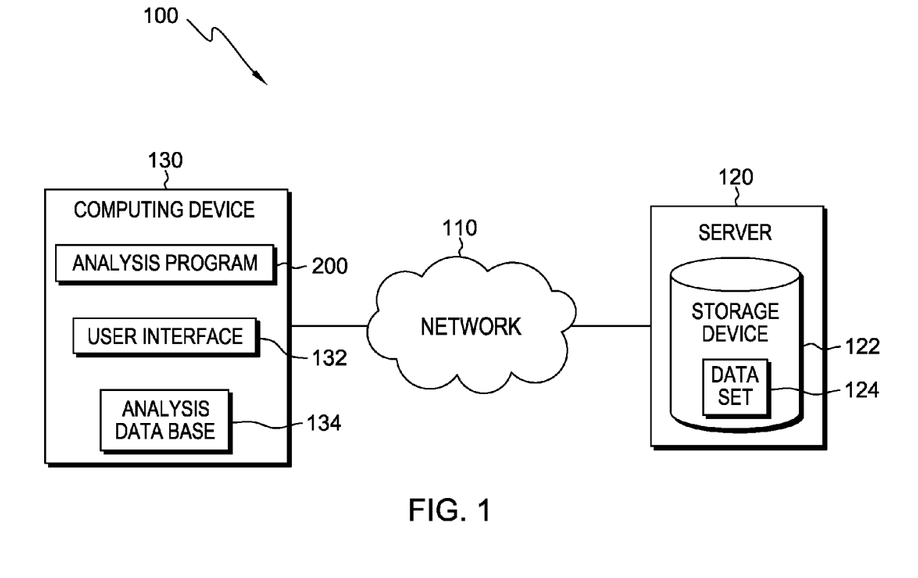
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention.

An embodiment of data processing environment 100 includes server 120 and computing device 130, interconnected over network 110. In an example embodiment, computing device 130 accesses and analyzes data that is hosted on server 120. In one embodiment, server 120 and computing device 130 communicate through network 110. Network 110 can be, for example, a local area network (LAN), a telecommunications network, a wide area network (WAN), such as the Internet, or any combination of the three, and include wired, wireless, or fiber optic connections. In general, network 110 can be any combination of connections and protocols that will support communications between server 120 and computing device 130, in accordance with embodiments of the present invention.

In example embodiments, server 120 can be a desktop computer, a computer server, or any other computer systems known in the art. In certain embodiments, server 120 represents computer systems utilizing clustered computers and components (e.g., database server computers, application server computers, etc.) that act as a single pool of seamless resources when accessed by elements of data processing environment 100 (e.g., computing device 130). In general, server 120 is representative of any electronic device or combination of electronic devices capable of executing computer readable program instructions. Server 120 may include components as depicted and described in further detail with respect to FIG. 5, in accordance with embodiments of the present invention.

Server 120 includes storage device 122, which includes data set 124. Storage device 122 can be implemented with any type of storage device, for example, persistent storage 505, which is capable of storing data that may be accessed and utilized by server 120 and computing device 130, such as a database server, a hard disk drive, or a flash memory. In other embodiments, storage device 122 can represent multiple storage devices within server 120. Storage device 122 stores a plurality of data sets, such as data set 124. Data set 124 is a collection of data that includes rows and columns of data. In one embodiment, data set 124 includes a set of data that can be depicted in the form of a graph (e.g., data set 124 includes rows and at least two columns). In another embodiment, data set 124 can be stored on computing device 130 where computing device 130 can locally access and analyze data set 124. In an example embodiment, data set 124 includes a plurality of sequences of data points, which can be representative of rows of data points and/or columns of data points.

In various embodiments of the present invention, computing device 130 may be a workstation, personal computer, personal digital assistant, mobile phone, or any other device capable of executing computer readable program instructions, in accordance with embodiments of the present invention. In general, computing device 130 is representative of any electronic device or combination of electronic devices capable of executing computer readable program instructions. Computing device 130 may include components as depicted and described in further detail with respect to FIG. 5, in accordance with embodiments of the present invention.

Computing device 130 includes user interface 132, analysis database 134, and analysis program 200. User interface 132 is a program that provides an interface between a user of computing device 130 and a plurality of applications that reside on the client device. A user interface, such as user interface 132, refers to the information (such as graphic, text, and sound) that a program presents to a user and the control sequences the user employs to control the program. A variety of types of user interfaces exist. In one embodiment, user interface 132 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 132 is a script or application programming interface (API). Analysis program 200 analyzes a data set utilizing inflection points to determine maximum and/or minimum values, in accordance with embodiments of the present invention.

In the depicted embodiment, analysis database 134 resides on computing device 130. In another embodiment, analysis database 134 may reside elsewhere in data processing environment 100, such as independently as a standalone database that is capable of communicating with computing device 130 via network 110 or in storage device 122 on server 120. Analysis database 134 stores data that is associated with data analysis performed by computing device 130 (e.g., utilizing analysis program 200). For example, analysis database 134 includes metadata associated with data set 124 (on server 120), such as row identification data (e.g., row IDs). In addition, analysis database 134 includes information on how computing device 130 analyzes data, which analysis program 200 can utilize, such as number of rows to use as a window for analysis data set 134 (e.g., 10 rows, 15 rows, 50 rows, etc.).

Figure 2:
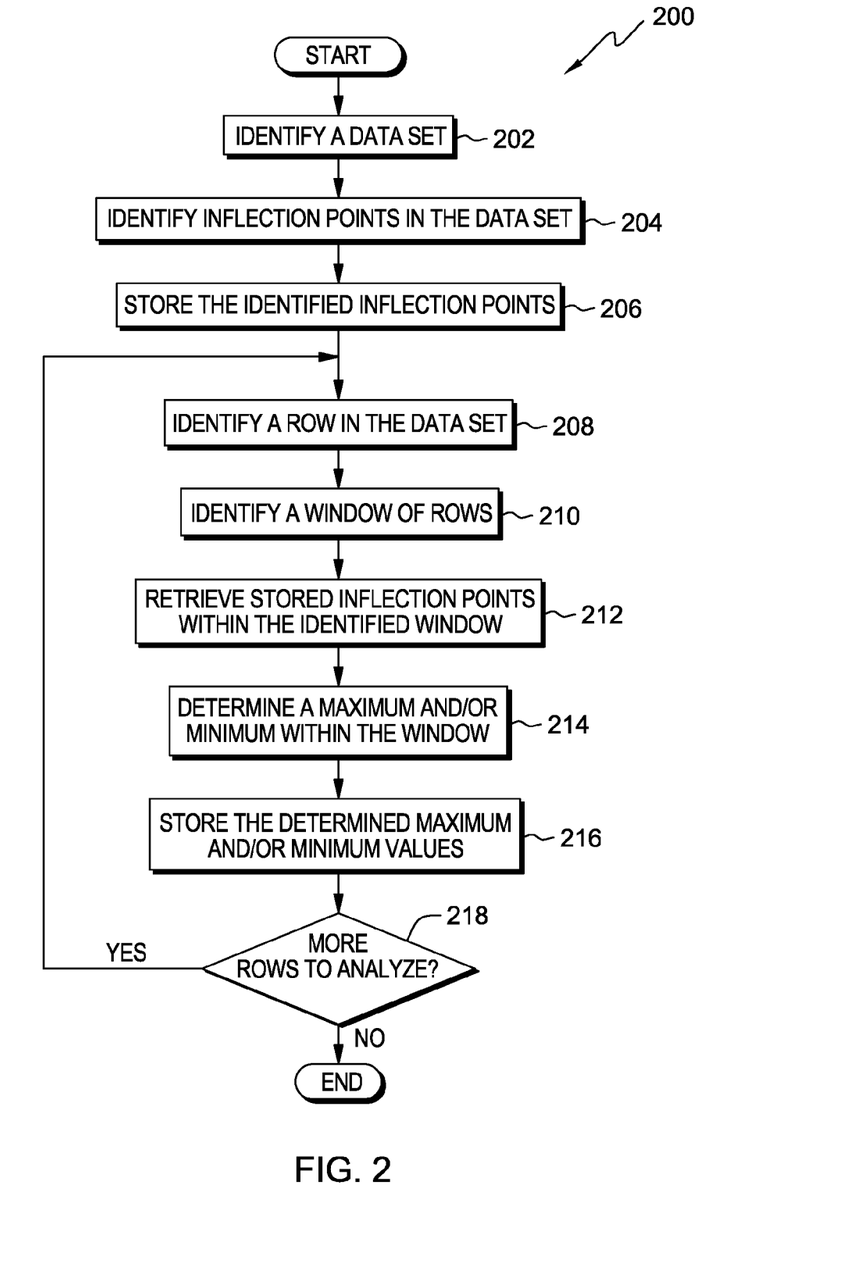
FIG. 2 is a flowchart depicting operational steps of a program for analyzing a data set utilizing inflection points, in accordance with an embodiment of the present invention.

FIG. 2 is a flowchart depicting operational steps of analysis program 200, a program for analyzing a data set utilizing inflection points, in accordance with embodiments of the present invention.

In step 202, analysis program 200 identifies a data set. In an example embodiment, computing device 130 receives user input into user interface 132 that indicates a data set to analyze (e.g., data set 124 on server 120), and analysis program 200 identifies and retrieves the indicated data set. In another embodiment, analysis program 200 receives a data set to analyze via network 110, for example, data set 124 from server 120. In another scenario, analysis program 200 identifies a data set that is stored on computing device 130 (not shown).

In step 204, analysis program 200 identifies inflection points in the data set. In one embodiment, analysis program 200 analyzes the data set (identified in step 202) to identify the inflection points in the data set. For example, analysis program 200 takes data set 124 and performs an initial pass over data set 124 to identify each point of inflection (e.g., transition from increasing values to decreasing values when seeking a maximum and transition from decreasing values to increasing values when seeking a minimum). Identifying each inflection point in a data set utilizes "n–1" comparisons for "n" rows of data. In an example embodiment, analysis program 200 identifies data set 123 and performs an initial pass over data set 124 to identify each inflection point. Analysis program 200 can identify inflection points in online data sets (e.g., data sets streaming to computing device 130) and offline data sets (e.g., static data sets accessed by computing device 130).

In an example embodiment, analysis program 200 identifies the inflection points of an offline data set. In this embodiment, analysis program 200 identifies each inflection point in the static data set and tags each identified inflection point with the corresponding metadata (e.g., metadata that indicates the inflection point's position within the data set, etc.).

In another example embodiment, analysis program 200 identifies the inflection points of an online, streaming data set. In this embodiment, computing device 130 is streaming a data set from server 120, which incrementally adds new data to the data set. Analysis program 200 identifies each inflection point in the initial instance of the data set. Then, in response to new data being "streamed" into the data set, analysis program 200 identifies the inflection points in the new data. Further, analysis program 200 identifies inflection points in each set of data streamed into the data set. Analysis program 200 identifies each inflection point in the streaming data set (as the streaming data enters the data set) and tags each identified inflection point with the corresponding metadata.

In step 206, analysis program 200 stores the identified inflection points. In one embodiment, analysis program 200 stores the identified inflection points of data set 124 and the corresponding metadata in analysis database 134 on computing device 130. In an example embodiment, analysis program 200 stores the identified inflection points (from step 204) in analysis database 134 utilizing the data set row identifiers (e.g., row IDs or other forms of encoded identification characteristics) that correspond to the inflection points, or another form of indexing information for the data set, such as a vector (e.g., a vector in a dynamic data set). For example, if analysis program 200 identifies an inflection point in row 17 of data set 124, analysis program 200 stores the inflection point as an indication that identifies row 17 as an inflection point (e.g., the row ID of row 17). In a scenario of a streaming data set, analysis program 200 stores the identified inflection points incrementally as new data streams into the data set. In an example embodiment, analysis program 200 stored the identified inflection points as encoded metadata that analysis program 200 can utilize to determine corresponding inflections points and associated rows.

In step 208, analysis program 200 identifies a row in the data set. In one embodiment, analysis program 200 identifies a row of data in data set 124. In one scenario, analysis program 200 identifies the first row in data set 124. In another scenario, analysis program 200 identifies a specified row of data in data set 124. In one example, analysis program 200 identifies a row specified by a user via input into user interface 132. In another example, analysis program 200 identifies a previously indicated specific row (e.g., a row that makes the window of rows start at row 1 of data set 124, such as a starting row of row 5 for a row window of 10 rows). In various other embodiments, analysis program 200 can identify a row based on other indications from computing device 130 (e.g., in analysis database 134), server 120, or other devices (not shown). In another scenario, analysis program 200 identifies a sequence of data points that can be a row of data points and/or a column of data points.

In step 210, analysis program 200 identifies a window of rows. In one embodiment, analysis program 200 identifies a window to utilize to analyze the data set. For example, an indication of which window to utilize is stored in analysis database 134 (e.g., defined by a customer). A window is a defined number of rows, in relation to the current row (identified in step 208), which analysis program 200 utilizes to analyze a data set. In an example, analysis program 200 identifies a window of 20 rows. In this example, if in step 208 analysis program 200 identified row 10 to be the current row, then the identified window covers rows 1-20 of the data set. In another example, analysis program 200 identifies a window of "the last 10 rows." In this example, if in step 208 analysis program 200 identified row 20 to be the current row, then the identified window covers rows 10-20 of the data set (e.g., the current row and the 10 previous rows). In another scenario, analysis program 200 identifies a window of sequences of data points, which can be a defined number of sequences of data points (e.g., rows or columns) before and after an identified sequence of data points, and can be a defined reference to a feature of the identified data set (e.g., the beginning or end of a sequence of data points).

In step 212, analysis program 200 retrieves the stored inflection points within the identified window. In one embodiment, analysis program 200 retrieves, from analysis database 134, a set of the stored inflection points that are within the identified window of rows (from step 210). In various embodiments, the retrieved set of inflection points can be an empty set (e.g., a set of zero inflection points), a set of one inflection point, or a set of two or more inflection points. In an example, in step 210 analysis program 200 identified the window of rows of data set 124 to be rows 1-20; therefore, analysis program 200 identifies the inflection points from rows 1-20 of data set 124 (stored in analysis database 134). Analysis program 200 can utilize the stored metadata of the inflection points (e.g., row IDs identified and stored in steps 204 and 206) to retrieve the inflection points that reside within the identified window of rows. In an example embodiment, an individual utilizing computing device 130 provides an indication (e.g., via user interface 132) of whether analysis program 200 is determining maximum or minimum values. In response to the indication of determining a maximum or minimum, analysis program 200 retrieves the corresponding stored inflection points (e.g., a maximum inflection point is a row where values go from increasing to decreasing, and a minimum inflection point is a row where values go from decreasing to increasing). In another embodiment, analysis program 200 can determine both maximum and minimum values.

In step 214, analysis program 200 determines a maximum and/or minimum within the window. In one embodiment, analysis program 200 utilizes the retrieved inflection points to determine maximum and/or minimum values within the window of rows in data set 124. In another embodiment, analysis program 200 can analyze multiple windows of rows in parallel. If the window of rows only includes one inflection point, then that inflection point is the local maximum or minimum value. Analysis program 200 identifies the corresponding value in the data set, which is the maximum value or minimum value.

If the window of rows does not include any inflection points, then analysis program 200 compares the values within the window from the start of the window to the end of the window and determines a maximum or minimum value. For example, if analysis program 200 is looking for a maximum, then analysis program 200 determines that the highest value within the window of rows is the local maximum value (e.g., utilizing the corresponding values in data set 124).

If the window of rows includes more than one inflection point, then analysis program 200 utilizes the corresponding values in data set 124 to determine which inflection point represents the highest value (for determining a maximum) or the lowest value (for determining a minimum). In an embodiment, since comparing inflection points occurs utilizing a reduced number of comparisons (in relation to all rows in the window), analysis program 200 can utilize a brute force comparison method. In another embodiment, if analysis program 200 is determining both maximum and minimum values, then analysis program 200 performs step 214 twice, once for determining maximum values, and once for determining minimum values.

In step 216, analysis program 200 stores the determined maximum and/or minimum values. In one embodiment, analysis program 200 stores the maximum and/or minimum values (determined in step 214) in analysis database 124, associated with data set 124. In another embodiment, analysis program 200 stores the data set row identifiers (e.g., row IDs) that correspond to the determined maximum and/or minimum values. For example, analysis program 200 stores the determined maximum and/or minimum values in an answer set that corresponds to data set 124 (e.g., the data set identified in step 202). In additional embodiments, analysis program 200 can update the stored answer set with new information (e.g., on additional iterations of analysis program 200).

In decision step 218, analysis program 200 determines whether the identified data set includes more rows to analyze. In one embodiment, analysis program 200 determines whether all rows in data set 124 have been analyzed. In another embodiment, analysis program 200 determines whether a requested set of rows (e.g., sequences of data points requested by a user to analyze) have all been analyzed. If analysis program 200 determines that the data set does not include any more rows to analyze (decision step 218, no branch), then analysis program 200 ends. In another embodiment, analysis program 200 provides the answer set corresponding to the data set (e.g., to a user of computing device 130) and ends.

If analysis program 200 determines that the data set does include more rows to analyze (decision step 218, yes branch), then analysis program 200 returns to step 208 to identify another row in the data set. In another embodiment, analysis program 200 returns to step 208 and increments the row identifier by one or another specified amount (e.g., a preset amount) to identify the next current row. For example, in step 208 analysis program 200 identified the current row to be row 70. In decision step 218 analysis program 200 determines that the data set includes more rows to analyze and increments the current row by one, resulting in row 71 being the current row.

In one embodiment, analysis program 200 utilizes decision step 218 as a loop, which allows an analysis of the data set utilizing a "sliding window." As analysis program 200 repeats, the window of the row being analyzed "slides" through the data set, which can reduce redundancy when comparing inflection points. Further, analysis program 200 can track the location of the maximum or minimum value in the window while the window is moving through the data set. Analysis program 200 can compare the newly introduced data from the data set (e.g., newly introduced from analysis program 200 repeating, streaming new data, etc.) to the current maximum or minimum value (e.g., most recently determined value). When the currently tracked maximum or minimum leaves the window, then analysis program 200 repeats and compares all inflection points in the new window.

Figure 3A:
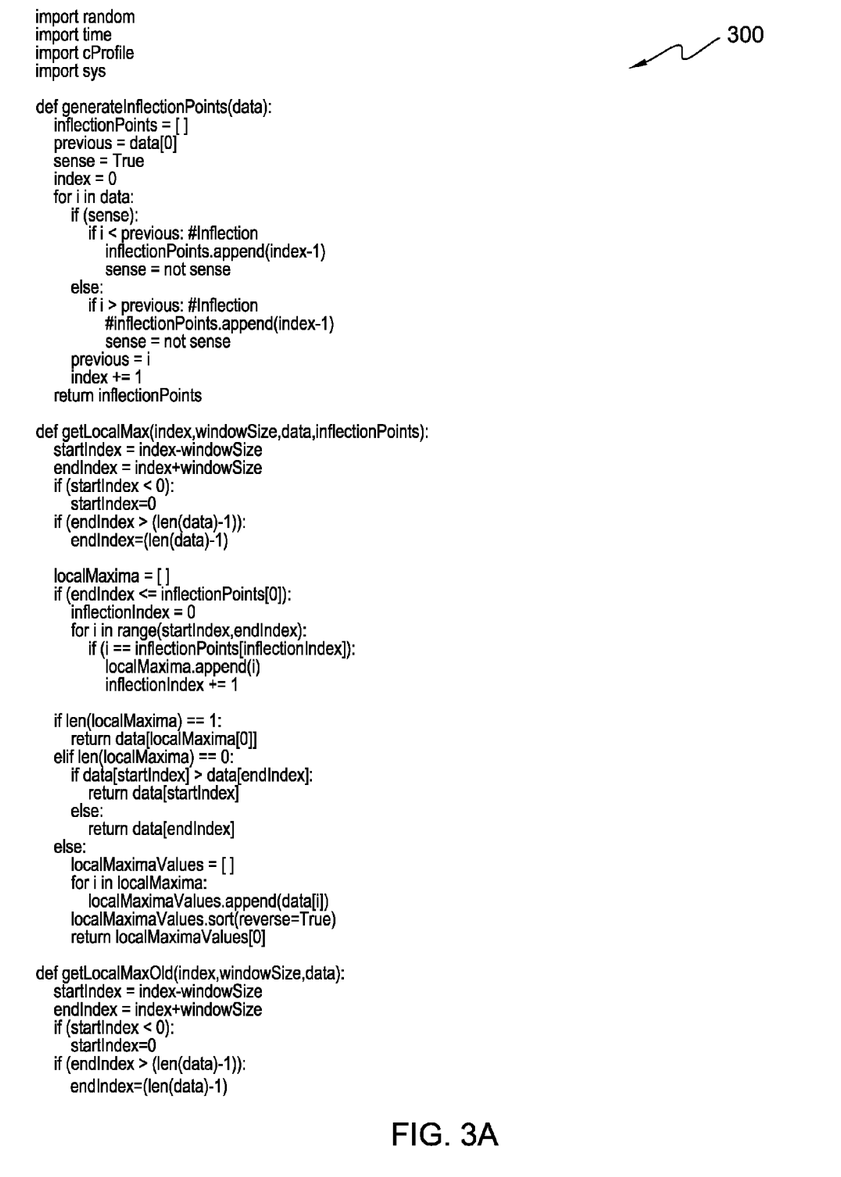
FIGS. 3A and 3B depict sample code 300, which analyzes a data set utilizing inflection points to determine maximum and/or minimum values, in accordance with embodiments of the present invention.
Figure 3B:
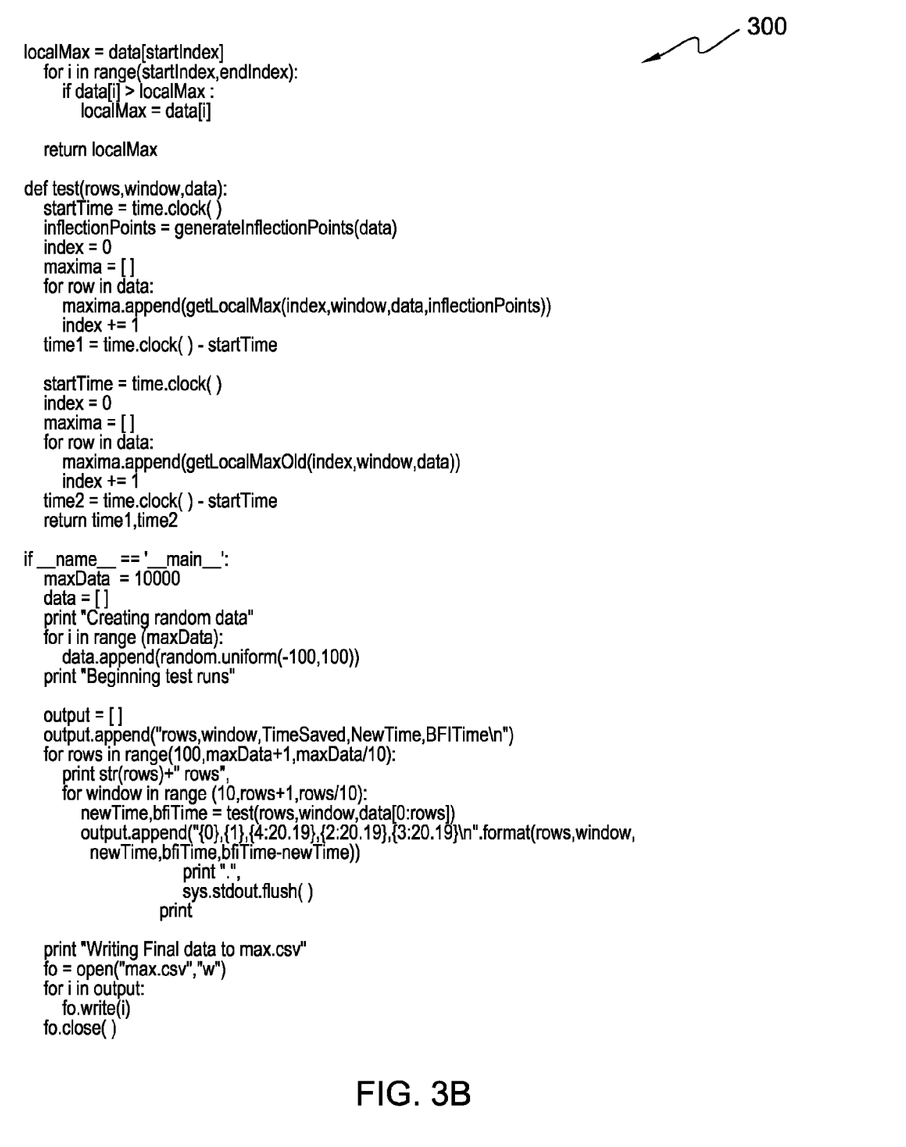

FIGS. 3A and 3B depict sample code 300, which analyzes a data set utilizing inflection points to determine maximum and/or minimum values, in accordance with embodiments of the present invention. In various embodiments, sample code 300 operates to perform one or more functions described in analysis program 200.

Figure 4A:
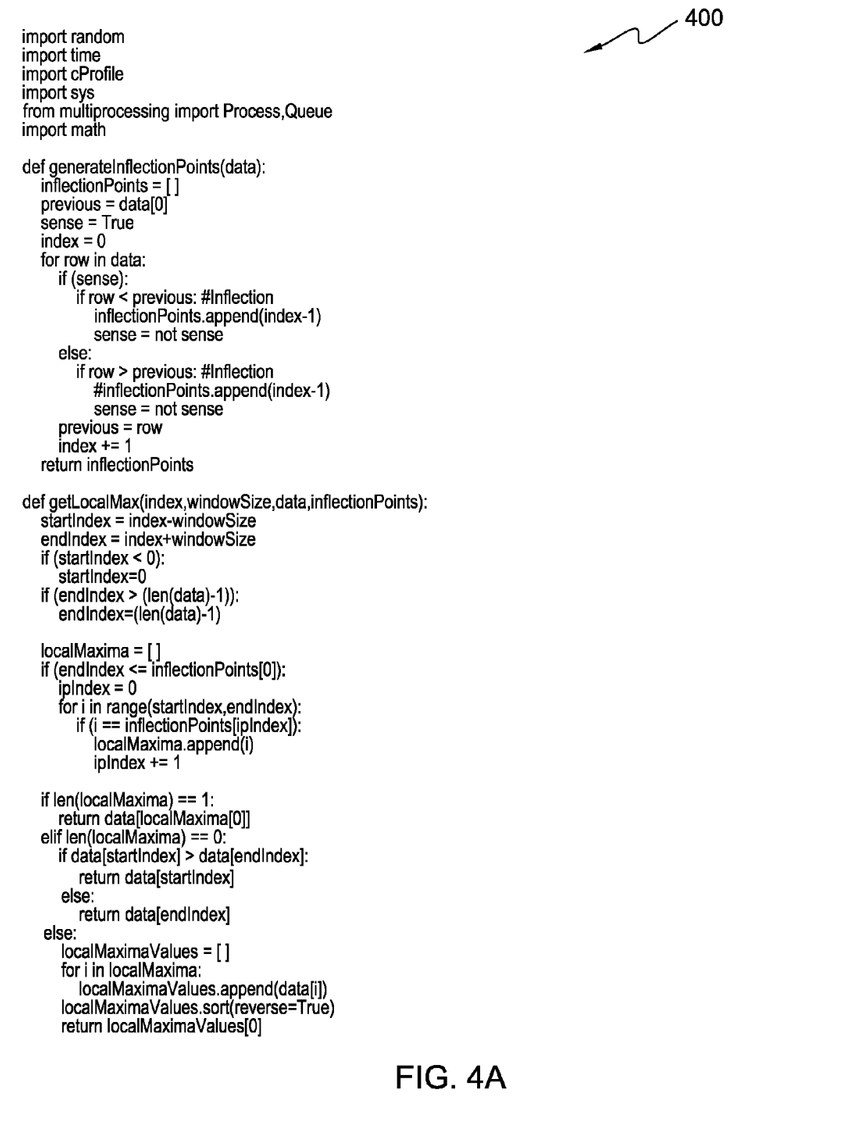
FIGS. 4A, 4B, and 4C depict sample code 400, which utilizes multiple analysis processes to analyze a data set utilizing inflection points to determine maximum and/or minimum values, in accordance with embodiments of the present invention.
Figure 4B:
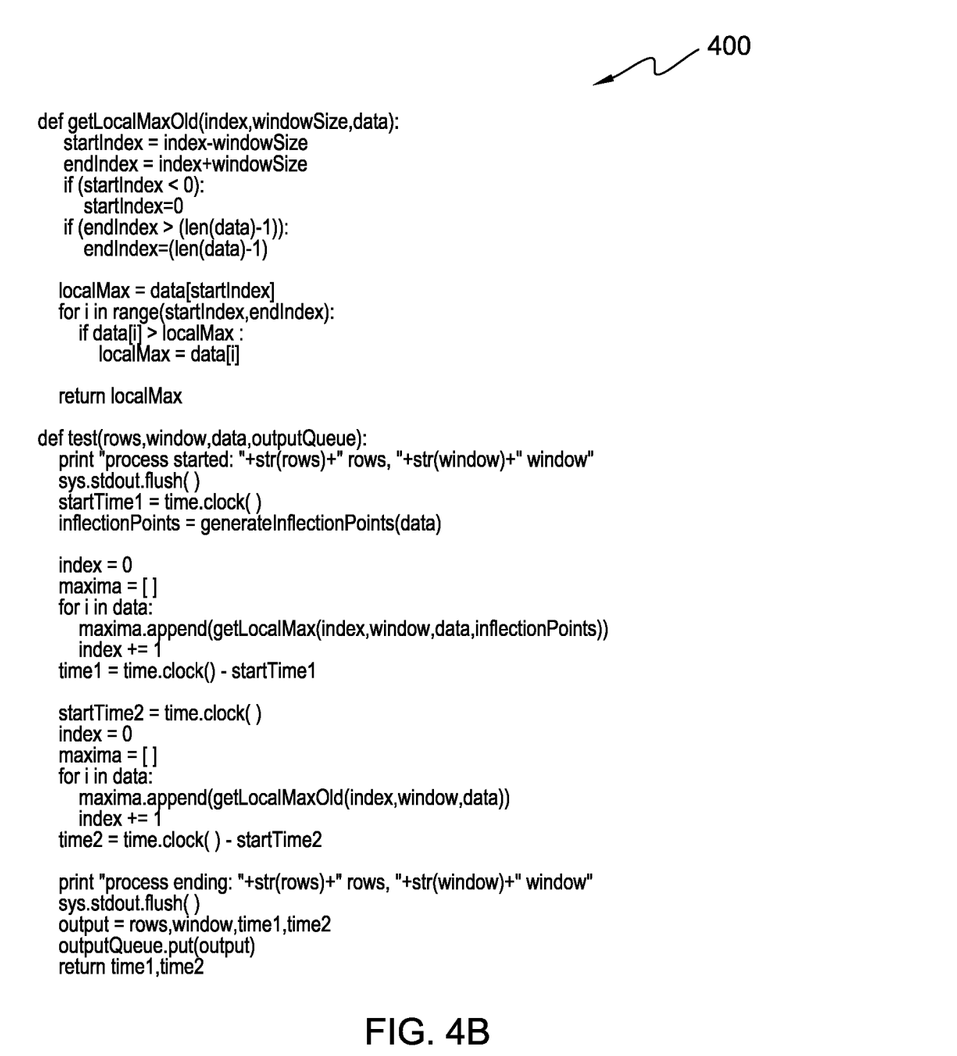
Figure 4C:
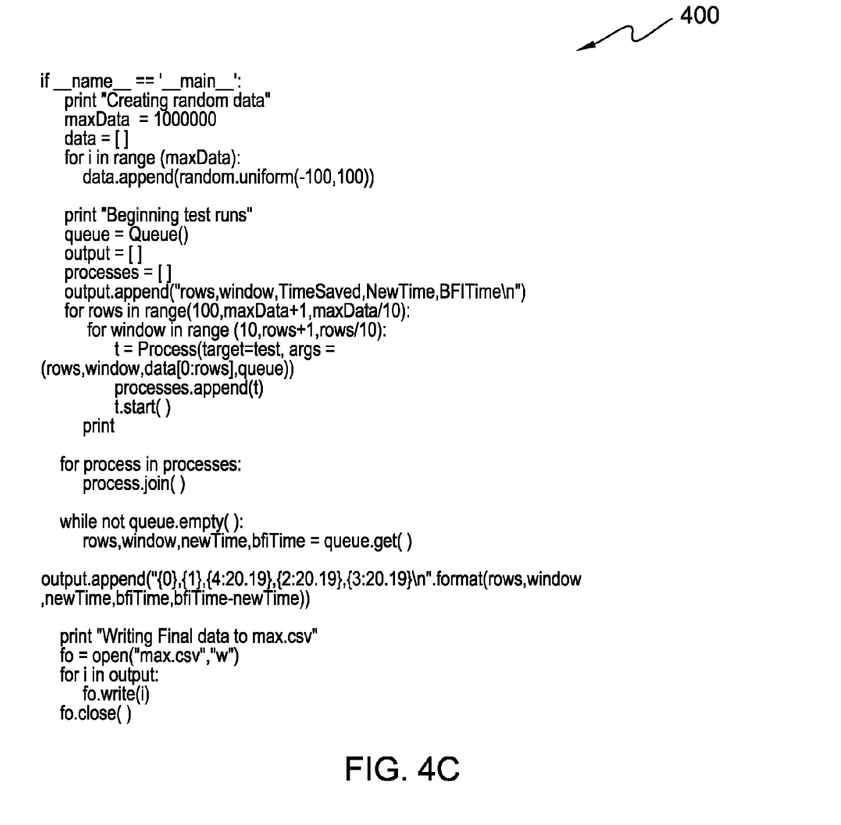

FIGS. 4A, 4B, and 4C depict sample code 400, which utilizes multiple analysis processes to analyze a data set utilizing inflection points to determine maximum and/or minimum values, in accordance with embodiments of the present invention. In various embodiments, sample code 400 operates to perform one or more functions described in analysis program 200.

Figure 5:
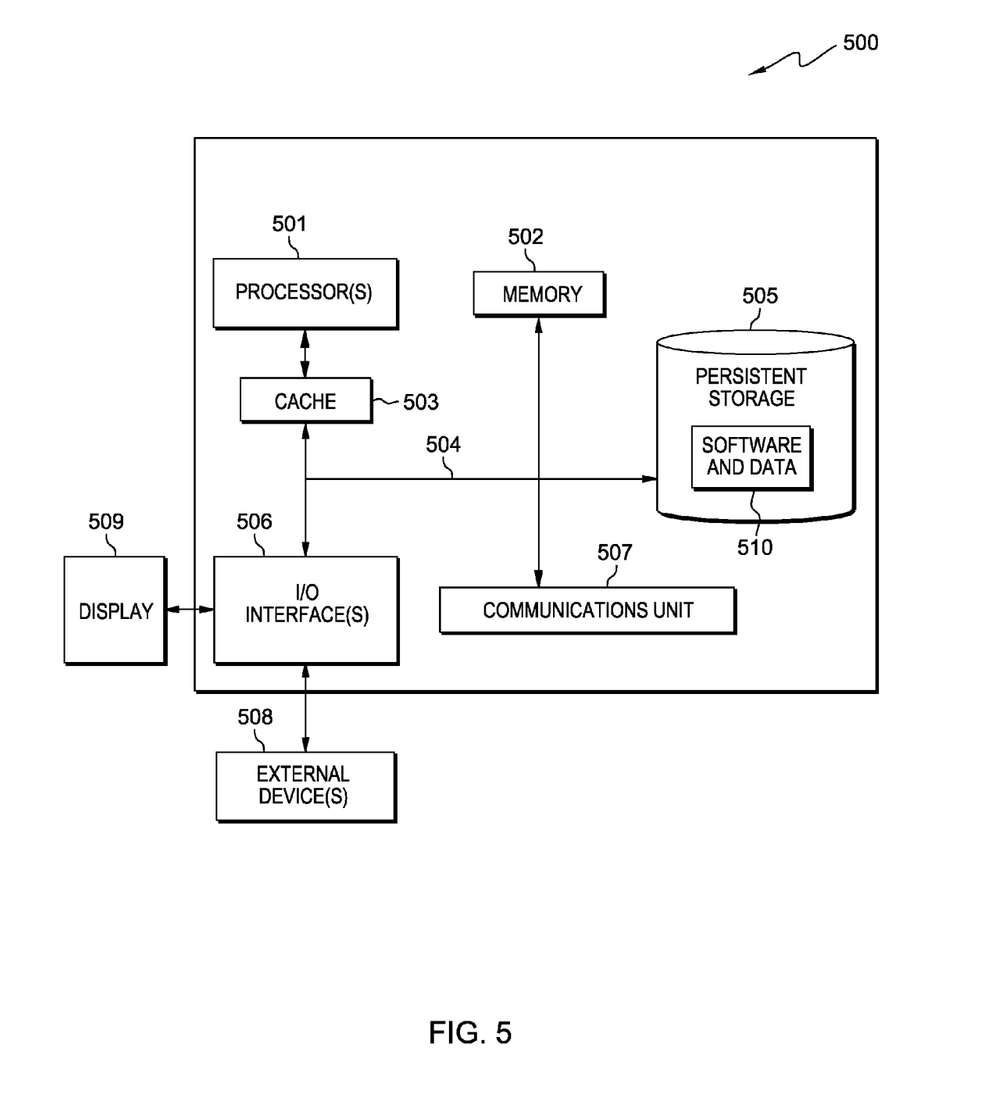
FIG. 5 depicts a block diagram of components of a computing system representative of the computing device and server of FIG. 1, in accordance with an embodiment of the present invention.

FIG. 5 depicts computer system 500, which is representative of server 120 and computing device 130, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made. Computer system 500 includes processors 501, cache 503, memory 502, persistent storage 505, communications unit 507, input/output (I/O) interface(s) 506, and communications fabric 504. Communications fabric 504 provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processors 501 by holding recently accessed data, and data near recently accessed data, from memory 502.

Program instructions and data (e.g., software and data 510) used to practice embodiments of the present invention may be stored in persistent storage 505 and in memory 502 for execution by one or more of the respective processors 501 via cache 503. In an embodiment, persistent storage 505 includes a magnetic hard disk drive. Alternatively, or in addition to a magnetic hard disk drive, persistent storage 505 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505. Software and data 510 can be stored in persistent storage 505 for access and/or execution by one or more of the respective processors 501 via cache 503. With respect to server 120, software and data 510 includes data set 124. With respect to computing device 130, software and data 510 includes analysis program 200 and analysis database 134.

Communications unit 507, in these examples, provides for communications with other data processing systems or devices. In these examples, communications unit 507 includes one or more network interface cards. Communications unit 507 may provide communications through the use of either or both physical and wireless communications links. Program instructions and data (e.g., software and data 510) used to practice embodiments of the present invention may be downloaded to persistent storage 505 through communications unit 507.

I/O interface(s) 506 allows for input and output of data with other devices that may be connected to each computer system. For example, I/O interface 506 may provide a connection to external devices 508 such as a keyboard, keypad, a touch screen, and/or some other suitable input device. External devices 508 can also include portable computer readable storage media such as, for example, thumb drives, portable optical or magnetic disks, and memory cards. Program instructions and data (e.g., software and data 510) used to practice embodiments of the present invention can be stored on such portable computer readable storage media and can be loaded onto persistent storage 505 via I/O interface(s) 506. I/O interface(s) 506 also connect to display 509.

Display 509 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for analyzing a data set, the method comprising:
   receiving, by one or more processors, from a server computer, a data set that includes sequences of data points, the sequences of data points included in the received data set arranged as rows and columns of data, wherein the data set is received from the server computer as a streaming data set;
   identifying, by one or more processors, a sequence of data points in the received data set;
   identifying, by one or more processors, a window of sequences of data points in the received data set, wherein the window of sequences of data points is defined based on information including one or more of: a defined number of sequences of data points before and after the identified sequence of data points and a defined reference to a feature of the received data set;
   retrieving, by one or more processors, a set of inflection points, from a database that stores previously identified inflection points associated with the received data set, in the received data set that are within the identified window of sequences of data points, wherein a maximum inflection point is a data point in a sequence of data points where values in the received data set transition from increasing in value to decreasing in value and a minimum inflection point is a data point in a sequence of data points where values in the received data set transition from decreasing in value to increasing in value; and
   determining, by one or more processors, one of: a maximum value, a minimum value, and both a maximum value and a minimum value, based on comparing the received data set to the retrieved inflection points that are within the identified window of sequences of data points.

2. The method of claim 1, wherein receiving the data set further comprises:
   identifying, by one or more processors, maximum inflection points and minimum inflection points in the received data set; and
   storing, by one or more processors, the identified maximum inflection points and minimum inflection points, wherein identified inflection points are stored utilizing indexing information that associates an inflection point with the corresponding sequence of data points in the received data set, and wherein the identified inflection points are stored as encoded metadata.

3. The method of claim 1, further comprising:
   storing, by one or more processors, the determined maximum value, minimum value, or both maximum value and minimum value in an answer set corresponding to the received data set; and
   wherein the sequences of data points included in the received data set are one of: rows of data points and columns of data points.

4. The method of claim 2, wherein identifying maximum inflection points and minimum inflection points in the received data set further comprises:
   receiving, by one or more processors, incrementally, new data streaming into the received data set from the server computer; and
   identifying, by one or more processors, maximum inflection points and minimum inflection points in the received new data streaming into the received data set from the server computer.

5. The method of claim 1, further comprising:
   determining, by one or more processors, whether the received data set includes more sequences of data points to analyze;
   responsive to determining that the received data set does include more sequences of data points to analyze, identifying, by one or more processors, an updated sequence of data points in the received data set that is incremented from the identified sequence of data points by a preset number of sequences of data points; and
   analyzing, by one or more processors, the received data set based on the identified updated row and maximum and minimum inflection points to determine one of: an updated maximum value, an updated minimum value, and both an updated maximum value and an updated minimum value.

6. The method of claim 1, wherein determining one of: a maximum value, a minimum value, and both a maximum value and a minimum value, further comprises:
   in response to the identified window of sequences of data points including zero inflection points, determining, by one or more processors, a highest value within the identified window of sequences of data points to be the maximum value and a lowest value within the identified window of sequences of data points to be the minimum value.

7. The method of claim 3, further comprising:
   determining, by one or more processors, whether the received data set includes more sequences of data points to analyze; and
   responsive to determining that the received data set does include more sequences of data points to analyze, providing, by one or more processors, the answer set corresponding to the received data set.

8. A computer program product for analyzing a data set, the computer program product comprising:
   one or more computer readable storage media and program instructions stored on the one or more computer readable storage media, the program instructions comprising:
   program instructions to receive, from a server computer, a data set that includes sequences of data points, the sequences of data points included in the received data set arranged as rows and columns of data, wherein the data set is received from the server computer as a streaming data set;
   program instructions to identify a sequence of data points in the received data set;
   program instructions to identify a window of sequences of data points, from a database that stores previously identified inflection points associated with the received data set, in the received data set, wherein the window of sequences of data points is defined based on information including one or more of: a defined number of sequences of data points before and after the identified sequence of data points and a defined reference to a feature of the received data set;

program instructions to retrieve a set of inflection points in the received data set that are within the identified window of sequences of data points, wherein a maximum inflection point is a data point in a sequence of data points where values in the received data set transition from increasing in value to decreasing in value and a minimum inflection point is a data point in a sequence of data points where values in the received data set transition from decreasing in value to increasing in value; and program instructions to determine one of: a maximum value, a minimum value, and both a maximum value and a minimum value, based on comparing the received data set to the retrieved inflection points that are within the identified window of sequences of data points.

9. The computer program product of claim 8, further comprising program instructions, stored on the one or more computer readable storage media, to:

identify maximum inflection points and minimum inflection points in the received data set; and storing, by one or more processors, the identified maximum inflection points and minimum inflection points, wherein identified inflection points are stored utilizing indexing information that associates an inflection point with the corresponding sequence of data points in the received data set, and wherein the identified inflection points are stored as encoded metadata.

10. The computer program product of claim 8, further comprising program instructions, stored on the one or more computer readable storage media, to:

store the determined maximum value, minimum value, or both maximum value and minimum value in an answer set corresponding to the received data set; and wherein the sequences of data points included in the received data set are one of: rows of data points and columns of data points.

11. The computer program product of claim 9, wherein the program instructions to identify maximum inflection points and minimum inflection points in the received data set further comprise program instructions to:

receive, incrementally, new data streaming into the received data set from the server computer; and identify maximum inflection points and minimum inflection points in the received new data streaming into the received data set from the server computer.

12. The computer program product of claim 8, further comprising program instructions, stored on the one or more computer readable storage media, to:

determine whether the received data set includes more sequences of data points to analyze;

responsive to determining that the received data set does include more sequences of data points to analyze, identify an updated sequence of data points in the received data set that is incremented from the identified sequence of data points by a preset number of sequences of data points; and analyze the received data set based on the identified updated row and maximum and minimum inflection points to determine one of: an updated maximum value, an updated minimum value, and both an updated maximum value and an updated minimum value.

13. The computer program product of claim 8, wherein program instructions to determine one of: a maximum value, a minimum value, and both a maximum value and a minimum value, further comprise program instructions to:

in response to the identified window of sequences of data points including zero inflection points, determine a highest value within the identified window of sequences of data points to be the maximum value and a lowest value within the identified window of sequences of data points to be the minimum value.

14. The computer program product of claim 10, further comprising program instructions, stored on the one or more computer readable storage media, to:

determine whether the received data set includes more sequences of data points to analyze; and responsive to determining that the received data set does include more sequences of data points to analyze, provide the answer set corresponding to the received data set.

15. A computer system for analyzing a data set, the computer system comprising:

one or more computer processors;

one or more computer readable storage media; and program instructions stored on the computer readable storage media for execution by at least one of the one or more processors, the program instructions comprising:

program instructions to receive, from a server computer, a data set that includes sequences of data points, the sequences of data points included in the received data set arranged as rows and columns of data, wherein the data set is received from the server computer as a streaming data set;

program instructions to identify a sequence of data points in the received data set;

program instructions to identify a window of sequences of data points, from a database that stores previously identified inflection points associated with the received data set, in the received data set, wherein the window of sequences of data points is defined based on information including one or more of: a defined number of sequences of data points before and after the identified sequence of data points and a defined reference to a feature of the received data set;

program instructions to retrieve a set of inflection points in the received data set that are within the identified window of sequences of data points, wherein a maximum inflection point is a data point in a sequence of data points where values in the received data set transition from increasing in value to decreasing in value and a minimum inflection point is a data point in a sequence of data points where values in the received data set transition from decreasing in value to increasing in value; and program instructions to determine one of: a maximum value, a minimum value, and both a maximum value and a minimum value, based on comparing the received data set to the retrieved inflection points that are within the identified window of sequences of data points.

16. The computer system of claim 15, further comprising program instructions, stored on the computer readable storage media for execution by at least one of the one or more processors, to:

identify maximum inflection points and minimum inflection points in the received data set; and storing, by one or more processors, the identified maximum inflection points and minimum inflection points, wherein identified inflection points are stored utilizing indexing information that associates an inflection point with the corresponding sequence of data points in the received data set, and wherein the identified inflection points are stored as encoded metadata.

17. The computer system of claim 15, further comprising program instructions, stored on the computer readable storage media for execution by at least one of the one or more processors, to:
store the determined maximum value, minimum value, or both maximum value and minimum value in an answer set corresponding to the received data set; and
wherein the sequences of data points included in the received data set are one of: rows of data points and columns of data points.

18. The computer system of claim 16, further comprising program instructions, stored on the computer readable storage media for execution by at least one of the one or more processors, to:
receive, incrementally, new data streaming into the received data set from the server computer; and
identify maximum inflection points and minimum inflection points in the received new data streaming into the received data set from the server computer.

19. The computer system of claim 15, further comprising program instructions, stored on the one or more computer readable storage media, to:
determine whether the received data set includes more sequences of data points to analyze;
responsive to determining that the received data set does include more sequences of data points to analyze, identify an updated sequence of data points in the received data set that is incremented from the identified sequence of data points by a preset number of sequences of data points; and
analyze the received data set based on the identified updated row and maximum and minimum inflection points to determine one of: an updated maximum value, an updated minimum value, and both an updated maximum value and an updated minimum value.

20. The computer system of claim 17, further comprising program instructions, stored on the one or more computer readable storage media, to:
determine whether the received data set includes more sequences of data points to analyze; and
responsive to determining that the received data set does include more sequences of data points to analyze, provide the answer set corresponding to the received data set.

* * * * *